United States Patent
Fujimoto

(10) Patent No.: US 6,508,737 B2
(45) Date of Patent: Jan. 21, 2003

(54) ECCENTRIC ORBITING TYPE SPEED REDUCER

(75) Inventor: Kenichi Fujimoto, Mie (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/765,786

(22) Filed: Jan. 19, 2001

(65) Prior Publication Data

US 2001/0012809 A1 Aug. 9, 2001

(30) Foreign Application Priority Data

Feb. 7, 2000 (JP) ........................................ 2000-029478

(51) Int. Cl.[7] ................................................ F16H 1/32
(52) U.S. Cl. ........................................................ 475/178
(58) Field of Search ................................. 475/178, 179

(56) References Cited

U.S. PATENT DOCUMENTS

| | | | | |
|---|---|---|---|---|
| 4,690,010 A | * | 9/1987 | Matsumoto et al. | 475/179 |
| 4,846,018 A | * | 7/1989 | Matsumoto et al. | 475/178 |
| 4,898,065 A | * | 2/1990 | Ogata et al. | 475/179 |
| 5,178,046 A | * | 1/1993 | Matsumoto et al. | 475/178 |
| 5,322,485 A | * | 6/1994 | Haga | 475/178 |

\* cited by examiner

*Primary Examiner*—Dirk Wright
(74) *Attorney, Agent, or Firm*—Akin Gump Strauss Hauer & Feld, L.L.P.

(57) ABSTRACT

In a speed reducer, because the idler gears 62 that mesh with the drive gear 58 and the external gears 55 fixed to the crankshafts 45 are provided between those gears 55 and 58, the reduction of the diameters of the external gears 55 and the drive gear 58 can be easily accomplished. Consequently, the inertia moment, and hence the size of the servomotor for driving, become smaller, and vibration and the noise caused by engagement can be reduced as well. The radial distance L between the crankshaft 45 and the center axis Z of the speed reducer 64 can be easily increased to improve the rigidity of the speed reducer 64 in the circumferential direction.

5 Claims, 3 Drawing Sheets

PRIOR ART

US 6,508,737 B2

ECCENTRIC ORBITING TYPE SPEED REDUCER

BACKGROUND OF THE INVENTION

This invention relates to an eccentric orbiting reducer where the speed reduction is achieved by eccentrically revolving the pinions.

In general, the eccentric orbiting reducer has been used in various applications, especially as a reducer for robotics, because it is compact and yet provides a high reduction ratio.

However, the eccentric orbiting reducer 11 available on the market has a shortcoming in that its rigidity in the rotational direction, which is an important property of a reducer for robotics, is low because the radial distance L between the crankshaft 12 and the center axis Z of the reducer 11 is relatively short as shown in FIG. 3.

One possible idea for solving such a problem would be to use larger diameter gears for both the external gear 14 fixed on the crankshaft 12 and a drive gear 15 that meshes with the external gear 14 in order to increase the above-mentioned radial distance L as shown in FIG. 4, thus improving the rigidity of the reducer 11 in the rotational direction.

However, such a reducer 11 with a large diameter external gear 14 and drive gear 15 has problems such that it has a large inertia moment because of large gears, so that it tends to generate substantial vibration during acceleration and deceleration and it also requires a larger servomotor to drive the drive gear 15. Moreover, since the external gears 14 and the drive gear 15 are large, it can create interference with the external gear 14 in the circumferential direction and noise due to a high circumferential speed.

SUMMARY OF THE INVENTION

The present invention intends to provide an eccentric orbiting type speed reducer that produces little vibration and noise, while it is capable of easily improving its circumferential rigidity although it is compact and economical and is also capable of having its drive gear concentric with the center axis of the reducer while increasing the radial distance L.

An eccentric orbiting type speed reducer, constructed as a preferred embodiment of the present invention, comprises: a cylindrical member having internal gear teeth on its inner circumference; pinions having external gear teeth that mesh with the internal gear teeth each having a number of teeth slightly less than the internal gear teeth; a carrier having pillars that penetrate through the pinions in an axial direction; multiple crankshafts that are arranged equiangularly in a circumferential direction, are rotatably supported by the carrier at both axial ends, penetrate through the pinions in the middle, and cause the pinions to eccentrically revolve when they rotate; external gears each fixed on one end of a respective one of the crankshafts; a drive gear located in a position surrounded by the external gears; and multiple idler gears, each of which is rotatably supported by the carrier to be located between a respective one of the external gears and the drive gears to mesh with those gears, wherein the rotation of the drive gear is transmitted through the idler gears and the external gears to the crankshafts to cause the pinions to revolve eccentrically as well as to reduce the eccentric rotation of the pinions by means of the external and internal gear teeth, so that the cylindrical member or the carrier can rotate at a slow speed.

By having idler gears that mesh with the external gears fixed to the crankshafts and the drive gear between them, the reduction of the diameters of the external gears and the drive gear can be easily achieved. As a consequence, the inertia moment of the drive gear as well as vibration during acceleration and deceleration become smaller, hence reducing the size of the servomotor as well. The reduction of the diameters of the external gear and the drive gear also reduces the circumferential speed of the external gears and the drive gear, which in turn reduces noise to improve the working environment. Having idler gears increases the distance between the crankshaft and the reducer center axis of the reducer in the radial direction, which contributes to an easy improvement of the rigidity of the speed reducer in the circumferential direction.

In order to rotate the pinion smoothly, it is necessary to have the rotating phases of the three crankshafts match completely, but the above-mentioned requirements can be satisfied as long as the assembly condition described in claim 2 is satisfied.

The present disclosure relates to the subject matter contained in Japanese patent application No. Hei. 2000-29478 (filed on Feb. 7, 2000), which is expressly incorporated herein by reference in its entirety.

DESCRIPTION OF THE PREFERRED EMBODIMENT

An embodiment of the invention is described referring to the accompanying drawings.

Figure 1:
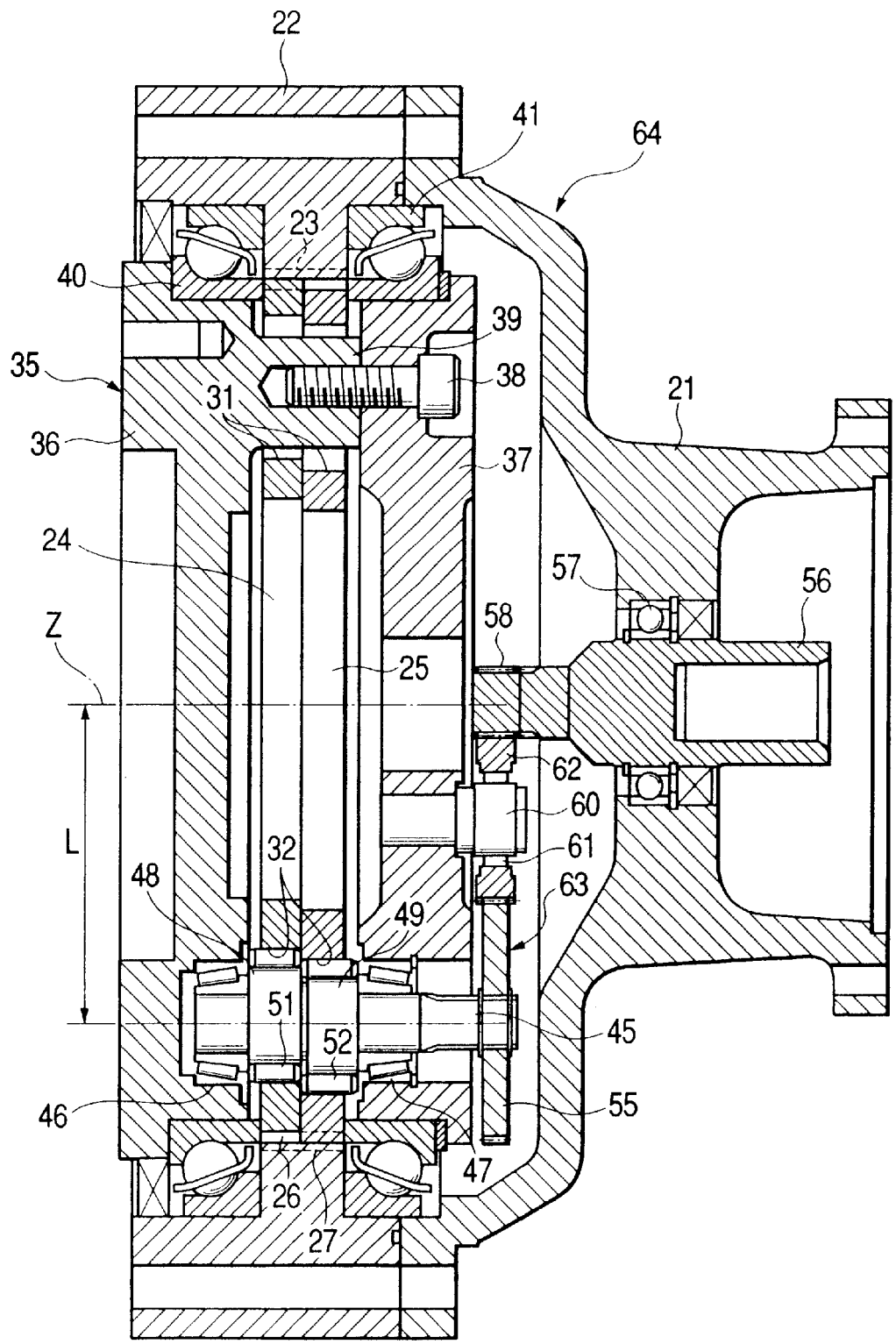
FIG. 1 is a cross sectional front view showing an embodiment of the invention
Figure 2:
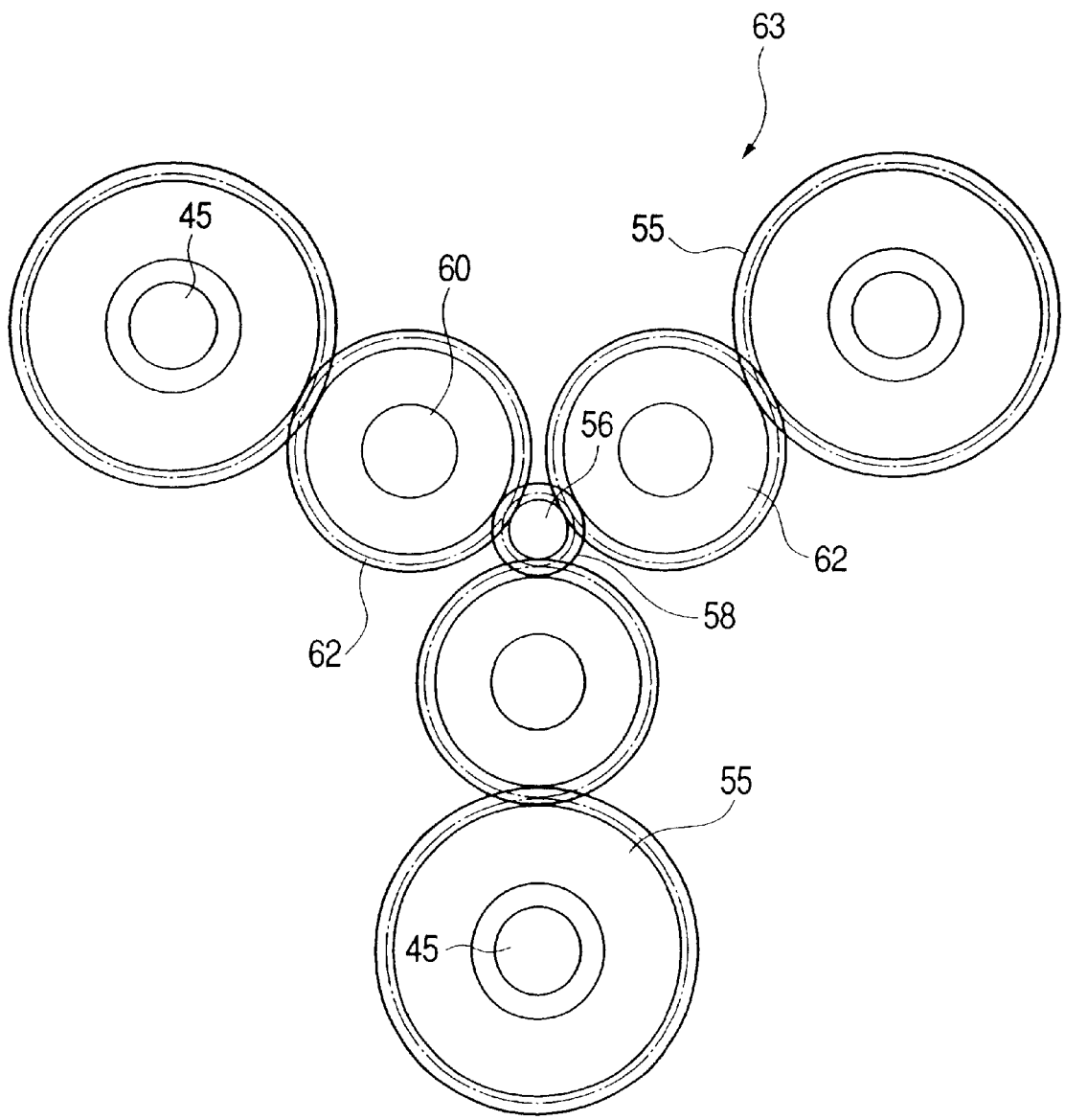
FIG. 2 is a Side view of the front stage gear speed reducing unit
Figure 3:
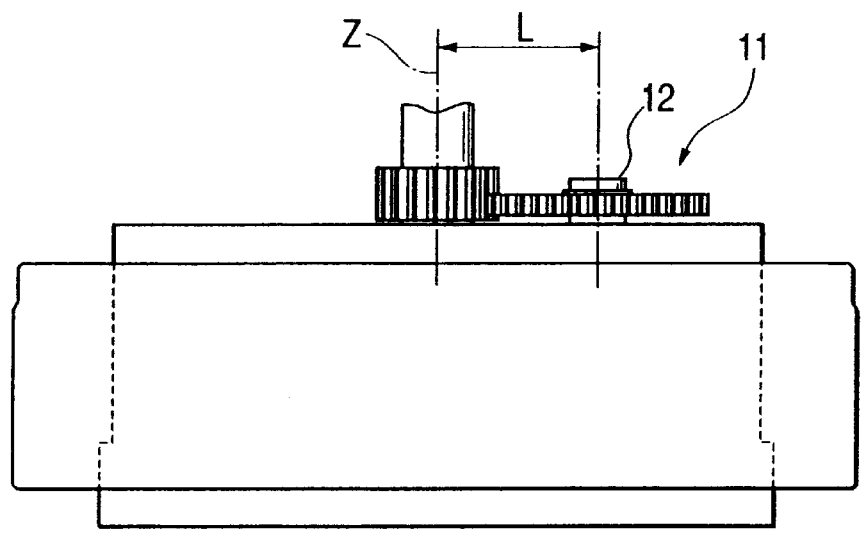
FIG. 3 is a front view of a related eccentric orbiting type speed reducer
Figure 4:
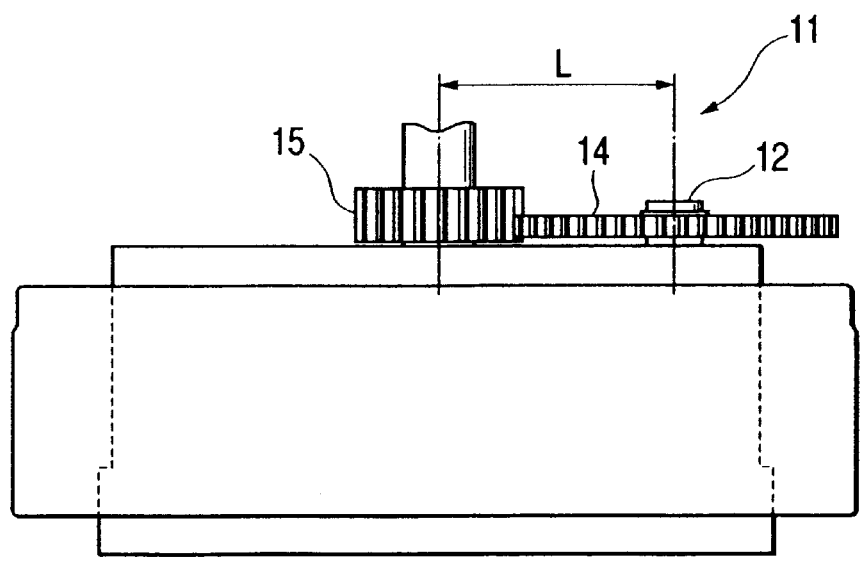
FIG. 4 is a font view of a conceivable example of the related eccentric orbiting type speed reducer

FIGS. 1 and 2 show a flange 21 of the servomotor, which will be described later, and a cylindrical member 22, which is attached to a robot arm (not illustrated) and also fixed on one end of the flange 21. Multiple internal tooth pins 23 inserted halfway and fixed thereby to the inner circumference of the cylindrical member 22 serve as the internal teeth and these internal tooth pins 23 extend axially and are also equally spaced in the circumferential direction. The cylindrical member 22 contains two ring-shaped pinions 24 and 25 placed axially apart from each other, and external gear teeth 26 and 27 formed on the outer circumference of pinions 24 and 25 respectively, where each of them has a number of teeth slightly less than the number of the internal tooth pins 23. While these external teeth 26 and 27 of both of these pinions 24 and 25 mesh with the internal tooth pins 23 of the cylindrical member 22, and the largest meshing points of these pinions 24 and 25 (the deepest points of the engagements of the teeth) are 180 degrees apart in phase angle.

The pinions 24 and 25 have multiple idle holes 31 and through holes 32 reciprocally formed in the circumferential direction. A carrier 35 is attached on a stationary robot member (not shown) enclosed in a cylindrical member 22, and the carrier 35 consists of a pair of circular disk-shaped end plates 36 and 37 that are placed on both external sides of the pinions 24 and 25 in the axial direction and pillars 39, one end of which is integrally connected to the end plate 36 and the other end connected to the end plate 37 by means of multiple bolts 38. The pillars 39 that connect the end plates 36 and 37 extend axially and loosely fit with idle holes 31 of the pinions 24 and 25. Bearings 40 and 41 are provided between the outer circumference of the end plates 36 and 37 and the inner circumference of the cylindrical member 22 and the cylindrical member 22 is supported rotatably by the carrier 35 by means of these bearings 40 and 41.

Multiple (3 in this case to match with the number of through holes 32) crankshafts 45 are spaced equiangularly in the circumferential direction, and one end of the crankshaft 45 in the axial direction is rotatably supported by the end plate 36 via a bearing 46, while the other end in the axial direction is rotatably supported by the end plate 37 via a bearing 47. Each crankshaft 45 has two eccentric cams 48 and 49, which are offset at an equal distance from the center axis of the crankshaft 45, in the middle of the shaft in the axial direction, and these eccentric cams 48 and 49 are 180 degrees apart in phase angle. The middle of the crankshaft 45, i.e., the eccentric cams 48 and 49, are inserted into the through hole 32 of the pinions 24 and 25 provided in roller bearings 51 and 52 respectively. When these crankshafts 45 rotate with a constant speed in the same direction, the pinions 24 and 25 revolve eccentrically with phases 180 degrees apart.

An external gear 55 is fixed to an end of each crankshaft 45 protruding from the end plate 37 to the other side. These external gears 55 are spaced equiangularly on a circle. A drive shaft 56 is supported rotatably by the flange 21 via a bearing 57 and this drive shaft 56 rotates driven by a servomotor (not illustrated). A large number of external teeth are formed on one end of the drive shaft 56 on the outer circumference and these external teeth constitute a drive gear 58 which drives and rotates. The drive gear 58 is surrounded by the external gears 55 and is concentric with the cylindrical member 22.

Multiple (as many as the number of the external gears 55) support shafts 60 are attached to the end plate 37 and the other end of each support shaft 60 supports an idler gear 62 rotatably via a roller bearing 61. Consequently, these multiple (as many as the number of external gears 55) idler gears 62 are supported rotatably by the carrier 35 via the supporting shafts 60. These idler gears 62 are provided between the external gears 55 and the drive gear 58 in such a way that their rotating shafts are on the straight lines connecting the rotating shafts of the external gears 55 and the drive gear 58., and so that they mesh with both the external gears 55 and the drive gear 58. These external gears 55, the drive gear 58 and the idler gears 62 constitute a front stage gear speed reducing unit 63, while the cylindrical member 22, the pinions 24 and 25, the carrier 35, the crankshafts 45, and the front gear reducing unit 63 constitute an eccentric orbiting type speed reducer 64.

In order for the pinions 24 and 25 to rotate smoothly, the rotating phases of all (three spaced equiangularly, in this case) the crankshafts 45 must match completely. The assembly constituting condition for the front stage gear speed reducing unit 63 is as follows assuming A is the number of teeth of the drive gear 58, B is the number of teeth of the external gear 55, and C is the number of teeth of the idler gear 62. The condition is: when the drive gear 58 is rotating clockwise between any pair of external gears 55 of the three external gears 55, the value obtained from either of the following equations (1) and (2) is a positive integer and further when the drive gear 58 is rotating counterclockwise between the same pair of external gears 55, the value of the other equation is also a positive integer.

$$N=(2A+B)/3 +C \tag{1}$$

$$P=(A+2B)/3+C \tag{2}$$

If the equation (1) is rewritten using a positive integer M=N−C, the following equation (3) is obtained.

$$2A+B=3M \tag{3}$$

Similarly, if the equation (2) is rewritten using a positive integer Q=P−C, the following equation (4) is obtained.

$$A+2B=3Q \tag{4}$$

If the number of teeth of the drive gear 58 and the number of teeth of the external gear 55 satisfy both of the above equations (3) and (4) when the rotating direction of the drive gear 58 is reversed, the assembly conditions will be met and the rotating phase of the three crankshafts 45 match completely and the pinions 24 and 25 rotate smoothly.

Next, the operation of an embodiment of the invention is described.

In reducing speed using the eccentric orbiting type speed reducer 64, the drive shaft 56 and the drive gear 58 are driven by a servomotor (not illustrated) and the rotation of this drive gear 58 is transmitted to the crankshafts 45 via the idler gears 62 and the external gears 55. Consequently, all the crankshafts 45 rotate around the center axis in the same direction at the same speed. The eccentric cams 48 and 49 of the crankshafts 45 rotate eccentrically inside the through holes 32 of the pinions 24 and 25 and cause the pinions 24 and 25 to rotate eccentrically (revolution). Since the number of external gear teeth 26 and 27 are slightly smaller than the number of internal tooth pins 23, the eccentric revolution of the pinions 24 and 25 is reduced in speed by means of the external gear teeth 26 and 27 and the internal tooth pins 23 at a high reduction ratio, and is transmitted to the cylindrical member 22 to cause the cylindrical member 22 to rotate at a low speed.

Since the idler gears 62 are provided between the external gears 55 fixed to the crankshafts 45 and the drive gear 58 to mesh with both gears 55 and 58, it is easy to make the diameter of the external gears 55 and the drive gear 58 smaller. Consequently, it is possible to reduce the inertia moment of the drive gear 58 and vibration during acceleration and deceleration, and so the compact size of the servomotor used to drive the drive gear 58 become sufficient. Moreover, reducing the diameter of the external gears 55 and the drive gears 58 reduce circumferential speeds and noise, which results in a better working environment. Furthermore, the use of the idler gears 62 makes it possible to increase the radial distance L between the crankshafts 45 and the center axis Z of the speed reducer 64, which in turn makes it easy to improve the circumferential rigidity of the speed reducer 64.

Although the cylindrical member 22 is rotatable, the carrier 35 is stationary, and a rotation inputted into the crankshafts 45 is speed-reduced by the pinions 24 and 25 to be outputted to the cylindrical member 22 in the above embodiment, and it is also possible to make the cylinder stationary and the carrier rotatable so that a rotation inputted into the crankshafts can be speed-reduced and outputted to the carrier.

As described above, the invention provides a compact and inexpensive speed reducer with less vibration and noise and high rigidity in the circumferential direction.

What is claimed is:

1. Eccentric orbiting type speed reducer comprising:
   a cylindrical member having internal gear teeth on its inner circumference;
   pinions, each having external gear teeth that mesh with the internal gear teeth;

a carrier having pillars that penetrate through the pinions in an axial direction;

multiple crankshafts arranged equiangularly in a circumferential direction, each of the crankshafts having axial ends both rotatably supported by the carrier, and an axial middle portion penetrating through the pinions;

external gears, each fixed to the one axial end of a respective one of the crankshafts;

a drive gear located in a position surrounded by the external gears;

multiple support shafts having axes disposed radially between an axis of the drive gear and axes of the external gears and being arranged equiangularly in a circumferential direction, each support shaft being fixedly attached at one end to the carrier; and multiple idler gears, each rotatably supported by the respective support shaft so as to be located between and mesh with the drive gear and a respective one of the external gears.

2. Eccentric orbiting type reducer of claim 1, wherein a number of teeth of each pinion is slightly less than the internal gear teeth.

3. Eccentric orbiting type reducer of claim 2, wherein the crankshafts are rotated to eccentrically rotate the pinions.

4. Eccentric orbiting type reducer of claim 3, wherein rotation of the drive gear is transmitted through the idler gears and the external gears to the crankshafts to eccentrically rotate the pinions while reduce eccentric rotation of the pinions using the external and internal gear teeth, thereby rotating the cylindrical member or the carrier at a slow speed.

5. Eccentric orbiting type speed reducer of claim 4, wherein the multiple crankshafts consists of three crankshafts that are arranged equiangularly in the circumferential direction, wherein the following equations are satisfied:

$$2A+B=3M$$

$$A+2B=3Q$$

where A is the number of teeth of the drive gear, B is the number of teeth of each external gear, and M and Q are both positive integers.

* * * * *